Figure 1:
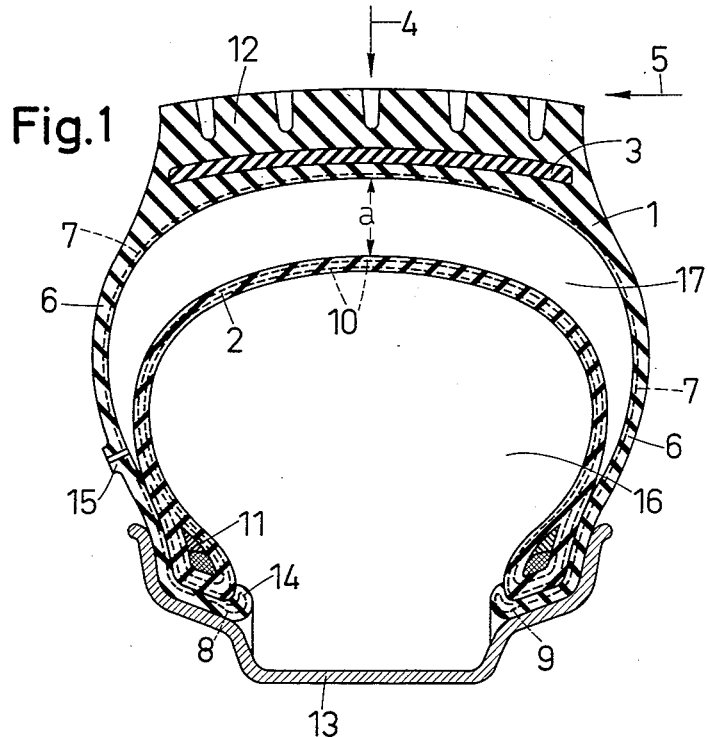
Figure 2:
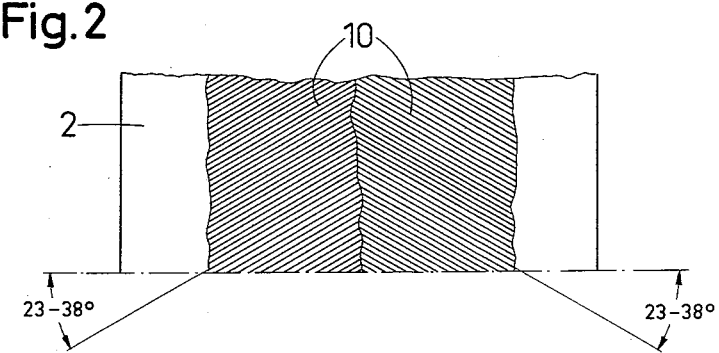

May 15, 1962  R. BECKADOLPH  3,034,557

VEHICLE TIRE

Filed Aug. 17, 1959

INVENTOR
Richard Beckadolph
BY

United States Patent Office 3,034,557
    Patented May 15, 1962

3,034,557
VEHICLE TIRE
Richard Beckadolph, Hannover, Germany, assignor to Continental Gummi-Werke Aktiengesellschaft, Hannover, Germany
Filed Aug. 17, 1959, Ser. No. 834,247
Claims priority, application Germany Aug. 23, 1958
4 Claims. (Cl. 152—340)

The present invention relates to tires for vehicles, especially street vehicles, and more specifically is directed to a pneumatic tire the zenith portion of which is provided with a circumferential breaker band extending substantially over the width of the tread area and being stiff in transverse direction. The tire is equipped with highly flexible lateral walls which are relatively thin and/or have embedded therein carcass threads which are arranged in or substantially in planes radial to the main axis of the tire.

The advantages of tires of this type are due to the breaker band which is stiff in transverse direction and brings about a reduced wear of the tread area while being adapted to absorb locally effective lateral forces without distortion of the ground ellipse. On the other hand, a tire of the above mentioned type has due to its highly flexible lateral walls a flat spring rate characteristic in such a way that driving shocks acting perpendicularly or substantially perpendicularly upon the tread area will be absorbed or cushioned in a soft manner.

However, tires of the above mentioned type have the drawback that in case very high lateral forces occur, the resistance of the breaker band responsible for the lateral stability will be overcome. If this occurs, the breaker band or the tread portion of the tire folds toward the side. Such behavior of the tire enhances great dangers because the tire first appears laterally stable under the influence of high lateral forces and then suddenly folds over. With pneumatic tires of other types, however, the lateral stability is safeguarded by the construction of the carcass. In this connection the reinforcing inserts crossing each other and anchored at the beads bring about a progressive effect. While a lateral displacement of the tread portion may also in this instance occur, a lateral folding of the tread portion can nevertheless not occur because the carcass threads crossing each other oppose such lateral movement by resistance forces which increase more and more with increasing displacement of the tread strip or tread portion.

In addition thereto, due to the fact that the carcass threads crossing each other and anchored to the beads must by necessity also extend through the lateral tire walls, the said carcass threads have the drawback that they stiffen the tire when the forces act perpendicular upon the thread.

It is, therefore, an object of the present invention to provide a tire or tire unit which will overcome the above mentioned drawbacks while maintaining the advantages outlined above of tires provided with a breaker band.

It is another object of this invention to provide a tire or tire unit of the type set forth in the preceding paragraph which will be relatively simple in manufacture and low in cost.

These and other objects and advantages of the invention will appear more clearly from the following specification in connection with the accompanying drawing showing a radial partial section through a tire of the present invention.

The tire or tire unit according to the present invention is characterized primarily in that a tire provided with a breaker band surrounds a supporting or inner tire which latter within the range of the zenith portion is spaced from the outer tire and is provided with carcass inserts anchored at its beads and comprising reinforcing inserts in the form of threads, cords, or the like, crossing each other and extending preferably at an angle of from 23 to 38° with regard to the circumferential zenith line of the tire. The said inner tire is filled with air having an higher pressure than the air in the outer tire.

So-called double tires in which an outer tire surrounds an inner tire the air pressure of which is in excess of the air pressure in the outer tire are known per se. However, with these heretofore known double tires, the inner tire carries the wheel load when the outer tire has suffered mechanical damage as for instance caused by sharp edged articles which have pierced the wall of the outer tire. In other words, with these heretofore known double tires, the inner tire has to safeguard a sufficient air cushion for receiving the wheel load when the outer air chamber surrounding the inner tire has lost its air pressure. In contrast thereto, with the tire unit according to the present invention, the outer tire is provided with the breaker band stiff in transverse direction and equipped with highly flexible lateral walls and is intended to carry the load and to determine the characteristics of the tire, whereas the inner tire with the inserts crossing each other is supposed to become effective only when, under the influence of extremely high lateral forces, the breaker band or the tread strip above the latter is in danger of folding. It is only at this time that the effect of the carcass inserts crossing each other is taken advantage of whereas the disadvantageous effect thereof, namely to stiffen the lateral walls of the tire, is eliminated during ordinary driving operations.

According to a further development of the present invention, the two tires supplementing each other are mounted on a rim common thereto and preferably in such a way that the marginal portions of the outer tire which are preferably flat, are clamped-in between the beads of the inner tire and the rim. In this way, a safe connection of both tires is obtained while simultaneously a considerable saving will result because the outer tire can then be made without beads or bead cores.

A further advantage of this arrangement consists in that the outer tire can easily be exchanged. The outer tire which is provided with a tread strip and is subjected to wear can be replaced as often as desired, whereas the inner tire provided with the beads may be retained since under normal conditions of operation said inner tire is subjected only to rather low stresses.

Referring now to the drawing in detail, the tire 1 shown therein comprises a breaker band or strip 3 extending substantially over the width of the tire and comprising for instance two or more layers of parallel cords, wire strands or the like which extend at an angle of approximately 15 to 25° relative to the circumferential direction of the tire. However, it is also possible to produce the breaker band or strip 3 without cords or the like embedded therein and to make said band or strip 3 of a flexible elastic but relatively hard material, such as a hard rubber composition. It is, however, important that the band 3 will be yieldable under the influence of forces 4 acting upon the tread surface in a direction perpendicular thereto, whereas said band or strip 3 must remain relatively stiff when subjected to transverse forces 5. A further feature of the tire 1 consists in that the lateral walls or flangs 6 of the tire are highly flexible. To this end, the tire has embedded therein cords or threads 7 which are located substantially in radial planes. These cords or threads 7 extend from one edge portion 8 of the tire to the other edge portion 9 of the tire. However, in certain circumstances no special inserts are required in the lateral tire wall 6. In other circumstances, inserts may be provided in the lateral tire wall 6 which cross each other at an acute angle provided, of course, that the flexibility of the lateral wall 6 is retained or remains high when the tire yields under the influence of the forces 4.

The inner tire 2 comprises thread or band-like reinforcing inserts 10 which cross each other and are arranged in two or more layers and are anchored to the beads 11 comprising steel wires or the like. The tire 2 may be relatively thin-walled and has a smooth outside, in other words, is not provided with a tread 12 as is the case with the outer tire 1.

In order to obtain a particularly favorable cross sectional shape and a high/resistance against lateral forces, the threads 10 extend at an angle of approximately from 23 to 38° with regard to the circumferential zenith line of the tire.

The marginal portions 8 and 9 of the outer tire 1 are clamped-in between the beads of the tire 2 and the rim 13. The outer tire 1 is not provided with beads, however, if desired, the marginal portions 8 and 9 may be provided with a reinforced or thickened portion 14. It is, of course, also possible to double said reinforcements 7 within the range of the marginal portions 8 and 9 thereby increasing the wall thickness of said inserts within said range. Within the chamber 16 confined by the inner tire 2 and the rim 13 there is to prevail a pressure of e.g. 3 atmospheres above atmospheric pressure, whereas a lower pressure is to be prevalent in the chamber 17 confined by the inner wall of the outer tire 1 and the outer wall of the inner tire 2. The pressure within said last mentioned chamber may correspond to the customary tire pressure as e.g. 1.5 atmospheres above atmospheric pressure. At any rate, the pressure in the inner chamber 16 should exceed the pressure in the outer chamber 17 by approximately from 1 to 2 atmospheres.

The compressed air may be introduced into the inner chamber 16 through an ordinary rim valve, whereas the outer chamber 17 may be filled with air through the intervention of a valve 15 of standard design which is arranged in the side wall 6 of the tire 1. When the tire unit 1, 2 is properly inflated, the distance $a$ between the inner tire 2 and the outer tire 1 within the range of the zenith portion of said tires should be approximately from 30 to 35 millimeters. While this distance may be reduced under static load, the dimensions and pressures should be so selected that during ordinary driving operations the inner tire portion below the tread area thereof should not contact the adjacent outer wall of the inner tire 2. The tire 2 is intended to become effective only when very high lateral forces 5 occur as may be the case for instance when driving through a curve, which high lateral forces will overcome or nearly overcome the resistance of the breaker band 3 so that the tire 1 might be in danger to turn over to the side or, in other words, when the tread 12 and the breaker band 3 begin to leave their normal parallel driving positions. In such an instance, the threads 10 of tire 2 which cross each other will prevent the feared folding movement of the breaker band 3 inasmuch as they counteract further lateral movements of the tire 1.

It is, of course, to be understood that the present invention is, by no means, limited to the particular constructions shown in the drawing but also comprises any modifications within the scope of the appended claims.

It is also to be noted that the particular dimensional values and pressure values set forth above are not limitative and have been given for a medium size passenger tire and may vary accordingly with other tire types and sizes.

What I claim is:

1. A tire assembly for vehicles which comprises in combination: a rim, a first bead free inflatable pneumatic tire provided with flat marginal annular inner portions within the range of its smallest diameter and with adjacent thickened annular edges, said flat portions being of substantially flat U-shaped cross section and being mounted on said rim so that said first tire confines together with said rim an annular chamber, said first tire having a tread portion and being provided within its zenith portion with a circumferential breaker band extending at least approximately over the width of the said tread portion and being relatively stiff in transverse direction of said breaker band, said first tire also being provided with lateral walls free of intersecting reinforcements and thus having highly flexible lateral walls, a second pneumatically inflatable tire arranged within said annular chamber and having its zenith portion spaced from the adjacent inner annular wall portion of said first tire, said second tire being provided with beads resting on the inside of the flat marginal portions of substantially flat U-shaped cross section of said first tire and against said thickened edge portions of said first tire to thereby clamp said flat annular inner marginal portions of said first tire between said beads and said rim, said second tire also being provided with carcass inserts anchored on said beads and including reinforcements crossing each other and extending at an acute angle with regard to the circumferential zenith line of said tire and the second tire having its side walls closely adjacent the side walls of the first tire in the region of the bead portion of the second tire.

2. In a tire unit for vehicles: a first bead free pneumatically inflatable tire having a tread portion and being provided within its zenith portion with a circumferential breaker band extending at least approximately over the width of said tread portion and being relatively stiff in transverse direction of said breaker band, said first tire also being provided with lateral walls free of intersecting reinforcements and thus having highly flexible lateral walls, and a second pneumatically inflatable tire arranged within the confines of said first tire and being provided with beads and also with carcass inserts anchored on said bead, the smallest diameter portions of said first tire forming annular channels of substantially flat U-shaped cross section for engaging on one side a rim and on the opposite side receiving and holding the beads of said second tire, said carcass inserts including reinforcements crossing each other and extending at an acute angle with regard to the circumferential zenith line of said second tire, the zenith portion of said second tire being spaced from the adjacent inner wall portion of said first tire by a distance which is greater than the cushioning shocks occurring during normal driving operation under the influence of forces acting perpendicularly or substantially perpendicularly upon said tread portion the walls of said tires converging on opposite sides of said zenith portion toward said rim and being in engagement in the region of the said beads on the second tire whereby the second tire, which has stiff side walls on account of the crossing reinforcements therein, supports the first tire against collapsing laterally under extreme loads.

3. A tire unit for vehicles, which comprises in combination: a first pneumatically inflatable bead-free tire provided with a tread portion and having within its zenith portion a circumferential breaker band extending at least approximately over the width of said tread portion and being relatively stiff in transverse direction of said breaker band, said first tire also being provided with lateral walls free of intersecting reinforcements and thus having highly flexible lateral walls, a second pneumatically inflatable tire arranged within said first tire and having its zenith portion spaced from the inner annular wall portion of said first tire below said breaker band, said second tire being provided with beads and also with carcass inserts anchored on said beads, the smallest diameter portions of said first tire forming annular channels for engaging on one side a rim and on the opposite side receiving and holding the beads of said second tire, said carcass inserts including reinforcements crossing each other and extending at an acute angle with regard to the circumferential zenith line of said second tire, said second tire having its side walls closely adjacent the side walls of said first tire in the region of the bead portions of said second tire.

4. An arrangement according to claim 3, in which the reinforcements of said carcass inserts comprise cords forming an angle of from 23 to 38° with the circumferential zenth line of said second tire.

References Cited in the file of this patent

UNITED STATES PATENTS

| | | |
|---|---|---|
| 2,173,065 | Lee | Sept. 12, 1939 |
| 2,498,859 | Lessig | Feb. 28, 1950 |
| 2,554,815 | Church | May 29, 1951 |
| 2,713,371 | King et al. | July 19, 1955 |
| 2,786,507 | Howe et al. | Mar. 26, 1957 |
| 2,898,969 | Pfeiffer | Aug. 11, 1959 |

FOREIGN PATENTS

| | | |
|---|---|---|
| 1,120,113 | France | Apr. 16, 1956 |
| 1,190,000 | France | Mar. 31, 1959 |